US011243899B2

(12) United States Patent
Chen et al.

(10) Patent No.: US 11,243,899 B2
(45) Date of Patent: Feb. 8, 2022

(54) FORCED DETACHING OF APPLICATIONS FROM DMA-CAPABLE PCI MAPPED DEVICES

(71) Applicant: International Business Machines Corporation, Armonk, NY (US)

(72) Inventors: Lior Chen, Jerusalem (IL); Constantine Gavrilov, Rishon LeZion (IL); Alexander Snast, Rishon LeZion (IL)

(73) Assignee: International Business Machines Corporation, Armonk, NY (US)

(*) Notice: Subject to any disclaimer, the term of this patent is extended or adjusted under 35 U.S.C. 154(b) by 376 days.

(21) Appl. No.: 15/581,430

(22) Filed: Apr. 28, 2017

(65) Prior Publication Data

US 2018/0314657 A1    Nov. 1, 2018

(51) Int. Cl.
*G06F 13/32*   (2006.01)
*G06F 9/54*    (2006.01)
(Continued)

(52) U.S. Cl.
CPC ............. *G06F 13/32* (2013.01); *G06F 9/54* (2013.01); *G06F 13/4282* (2013.01);
(Continued)

(58) Field of Classification Search
CPC . G06F 13/32; G06F 9/442; G06F 9/54; G06F 12/128; G06F 13/4282;
(Continued)

(56) References Cited

U.S. PATENT DOCUMENTS 5,604,843 A    2/1997  Shaw et al.
6,263,360 B1*  7/2001  Arnold ..................... G06F 8/65
                                              707/999.01
(Continued)

OTHER PUBLICATIONS

List of IBM Patents or Patent Applications Treated as Related, May 12, 2017, 2 pages.
(Continued)

*Primary Examiner* — Farley Abad
*Assistant Examiner* — Herve Iradukunda
(74) *Attorney, Agent, or Firm* — Stephen R. Tkacs; Stephen J. Walder, Jr.; Tihon Poltavets (57) ABSTRACT

A mechanism is provided in a data processing system comprising at least one processor and at least one memory, the at least one memory comprising instructions that are executed by the at least one processor and configure the at least one processor to implement a device context device driver for forced detaching of an application from mapped devices. The device context device driver receives a command to detach an application, wherein the command specifies a process descriptor associated with the application. The device context device driver identifies a plurality of matching device context entries in a list of open device contexts maintained by the device context device driver that match the process descriptor. The device context device driver marks the plurality of matching device context entries as detached. The device context device driver invalidates mapped memory areas associated with the plurality of matching device context entries. The device context device driver shuts down all device contexts associated with the plurality of matching device context entries.

20 Claims, 4 Drawing Sheets

(51) Int. Cl.
*G06F 13/42* (2006.01)
*G06F 12/0871* (2016.01)
*G06F 12/0891* (2016.01)

(52) U.S. Cl.
CPC ...... *G06F 12/0871* (2013.01); *G06F 12/0891* (2013.01); *G06F 2212/1024* (2013.01); *G06F 2212/1032* (2013.01); *G06F 2212/206* (2013.01); *G06F 2212/222* (2013.01); *G06F 2212/286* (2013.01); *G06F 2212/313* (2013.01); *G06F 2213/0024* (2013.01)

(58) Field of Classification Search
CPC ......... G06F 12/0891; G06F 2212/1024; G06F 2212/1032; G06F 2212/222; G06F 2212/286; G06F 2212/313; G06F 2213/0024; G06F 12/0871; G06F 2212/206; G06F 9/4411
See application file for complete search history.

(56) References Cited

U.S. PATENT DOCUMENTS

| | | | |
|---|---|---|---|
| 6,704,806 B1* | 3/2004 | Decker | G06F 9/4843 717/127 |
| 7,103,626 B1 | 9/2006 | Recio et al. | |
| 7,103,888 B1 | 9/2006 | Cayton et al. | |
| 7,685,254 B2 | 3/2010 | Pandya | |
| 7,694,312 B2 | 4/2010 | Rivard et al. | |
| 7,953,854 B2 | 5/2011 | Elnozahy et al. | |
| 8,122,120 B1 | 2/2012 | Athreya et al. | |
| 8,271,669 B2 | 9/2012 | Bestler | |
| 8,601,250 B2 | 12/2013 | Kochar et al. | |
| 8,681,606 B2 | 3/2014 | Gavrilov et al. | |
| 8,780,913 B2 | 7/2014 | Gavrilov et al. | |
| 8,893,013 B1 | 11/2014 | Groves et al. | |
| 8,959,171 B2 | 2/2015 | Chadalapaka | |
| 9,047,178 B2 | 6/2015 | Talagala et al. | |
| 9,389,976 B2 | 7/2016 | Doshi et al. | |
| 2002/0087778 A1* | 7/2002 | Schoinas | G06F 12/082 711/1 |
| 2003/0043757 A1 | 3/2003 | White | |
| 2005/0132017 A1 | 6/2005 | Biran et al. | |
| 2005/0278724 A1* | 12/2005 | Buskens | G06F 9/485 719/310 |
| 2005/0283636 A1* | 12/2005 | Vasudevan | G06F 11/203 714/2 |
| 2007/0002838 A1* | 1/2007 | Komura | H04L 63/145 370/352 |
| 2007/0282967 A1 | 12/2007 | Fineberg et al. | |
| 2008/0163176 A1* | 7/2008 | Krauss | G06F 11/3612 717/128 |
| 2009/0307378 A1 | 12/2009 | Allen et al. | |
| 2012/0099585 A1 | 4/2012 | Yamamoto et al. | |
| 2012/0102504 A1* | 4/2012 | Iyer | G06Q 10/00 719/318 |
| 2012/0158794 A1* | 6/2012 | DeBacker | G06F 9/449 707/803 |
| 2012/0221803 A1 | 8/2012 | Stabrawa et al. | |
| 2013/0051394 A1 | 2/2013 | Gavrilov | |
| 2013/0185428 A1 | 7/2013 | Houghton et al. | |
| 2014/0177639 A1 | 6/2014 | Vershkov et al. | |
| 2014/0358972 A1 | 12/2014 | Guarriere et al. | |
| 2015/0089303 A1* | 3/2015 | Cardona | G06F 11/0775 714/48 |
| 2015/0264116 A1 | 9/2015 | Weiny et al. | |
| 2015/0281126 A1 | 10/2015 | Regula et al. | |
| 2016/0041906 A1* | 2/2016 | Mukherjee | G06F 11/00 711/119 |
| 2016/0127495 A1 | 5/2016 | Tasoulas et al. | |
| 2016/0179640 A1* | 6/2016 | Murata | G06F 11/2015 714/14 |
| 2017/0161212 A1* | 6/2017 | Campbell | G06F 1/3293 |
| 2017/0187846 A1 | 6/2017 | Shalev et al. | |

OTHER PUBLICATIONS

Behrens, Jonathan et al., "Pushing Bytes: Cloud Scale Big-Data Replication with RDMC", Cornell University, Department of Computer Science, http://www.cs.cornell.edu/projects/quicksilver/public_pdfs/socc2016-paper17.pdf, (month unknown), 2016, 13 pages.

Merkin, C. M., "Method to Bound Peripheral Component Interconnect System Configurations", IBM Technical Disclosure Bulletin, vol. 37, No. 10, Abstract Only, Oct. 1, 1994, 2 pages.

Poke, Marius et al., "DARE: High-Performance State Machine Replication on RDMA Networks", ACM, Proceedings of the 24th International Symposium on High-Performance Parallel and Distributed Computing, HPDC'15, Portland, Oregon, Jun. 15-19, 2015, pp. 107-118.

Tasoulas, Evangelos et al., "A Novel Query Caching Scheme for Dynamic InfiniBand Subnets", IEEE, 2015 15th IEEE/ACM International Symposium on Cluster, Cloud and Grid Computing, May 4, 2015, pp. 199-210.

Wei, Xingda et al., "Fast in-memory Transaction Processing using RDMA and HTM", ACM, SOSP'15, Monterey, California, Oct. 4-7, 2015, pp. 87-104.

\* cited by examiner

FORCED DETACHING OF APPLICATIONS FROM DMA-CAPABLE PCI MAPPED DEVICES

BACKGROUND

The present application relates generally to an improved data processing apparatus and method and more specifically to mechanisms for forced detaching of applications from direct memory access (DMA) capable peripheral component interconnect (PCI) mapped devices.

Peripheral component interconnect (PCI) devices have a set of registers referred to as "configuration space" for devices. Configuration space registers are mapped to memory locations. Device drivers and diagnostic software must access the configuration spaces, and operating systems have application programming interfaces (APIs) to allow access to device configuration space. Additionally, PCI devices may have its own private memory, available as addressable memory regions. A PCI device may have one or several memory regions. Device drivers and diagnostic software can access these regions to "drive" device to implement hardware dependent tasks, while operating systems provide application programming interfaces (APIs) to allow access to these regions.

A modern computer operating system usually segregates virtual memory into kernel space and user space. Primarily, this separation serves to provide memory protection and hardware protection from malicious or errant software behavior. Kernel space is strictly reserved for running a privileged operating system kernel, kernel extensions, and most device drivers. In contrast, user space is the memory area where application software and some drivers execute.

As an alternative to a traditional I/O model, existing operating systems provide a user-space application with means to directly map the memory available to the kernel to a user space address range. In the context of device drivers, this can provide user space applications direct access to the device memory, which includes register configuration and I/O descriptors. All accesses by the application to the assigned address range ends up directly accessing the device memory. This allows implementation of most common 10 operations in user-space, without a need to perform a context switch to operating system kernel for each IO. A classic example of such approach is VERBS interface for user-space applications that allows access to RDMA capable devices like Infiniband™ or high speed Ethernet™. VERBS interfaces exist for Windows™, Linux™, and Unix™ operating systems. VERBS interfaces provide device independent APIs to map virtual and PCI memory to user space, and standard APIs to access RDMA capable hardware that thin device drivers implement as device dependent plugins. Applications fall to kernel for initialization tasks (like opening device contexts, object creation, and mapping virtual and PCI memory), and rely on user-space drivers for common IO tasks. Verbs user-space drivers are device-dependent plugins, that implement standard VERBS APIs and operate on device contexts (virtual and PCI memory) that were mapped to user-space.

Another example of this approach is Linux™ user input/output (UIO) framework for developing user space based device drivers. The UIO framework defines a small kernel space component, which performs 2 key tasks: (1) indicate device memory regions to user space and (2) register for device interrupts and provide interrupt indication to user space.

Both approaches need to track device contexts. The context of a device is the current state of the device hardware. The device driver (UIO or VERBS) manages the device context for a process on behalf of the process. The driver must maintain a separate device context for each process that accesses the device. The device driver has the responsibility to restore or select the correct device context when a process accesses the device. VERBS devices (like Infiniband™ or fast Ethernet™) provide a good example of device context management. VERBS interface enables user processes to directly manipulate the control registers of the device through memory-mapped access. Because these processes do not use traditional system calls for IO operations, a process that accesses the device need not call the device driver. However, the device driver must be called when a process initializes device. Kernel device driver is called to open device, to map memory to user-space application, and to create various objects that have hardware contexts (like queue pairs (QPs), completion queues (CQs), memory regions (MRs), shared receive queues (SRQs)). All these objects belong to a given device context, and use virtual, register and PCI memory that is mapped to a single process. In this way, memory protection and device context protection is achieved between processes that open different device contexts. When these objects are created or destroyed, the verbs driver in kernel needs to restore and select the correct device context and needs to provide any necessary synchronization.

To resolve this problem, the device context management interfaces enable a device driver to be called when a user process opens and closes a device context or creates and destroys objects in a given context. The responsibility of the device driver is then to control accesses to the device's hardware and to track and manage all device contexts and objects within them. When a user process calls kernel device driver, the device driver must restore and select the correct device context for that process. A device driver is called whenever a user process performs any of the following actions: creates a mapping, duplicates a mapping, frees a mapping, creates or destroys objects that are tied to a mapping.

Multiple user processes may have memory-mapped a device. The driver allocates a set of PCI registers, virtual and PCI memory and grants a first process access to the device via a set of memory mappings. The driver saves the device context for the first process. The first process no longer needs to fall to kernel driver to perform IO tasks. When, at some point in the future, the second process asks for access to the device, the kernel device driver is called and a new set of PCI registers, virtual and PCI memory is allocated and mapped to the second process. The driver then saves the device context for the second process. The first process cannot access the device context of the second process and vice versa. For example, for VERBS devices, the first process cannot access connections of the second process When a first or second process wishes to close its device context (or some objects within the context), the device driver selects the correct device context and operates on objects within that context only. For example, an application using VERBS interface may wish to destroy a subset of its connections, in which case a subset of objects in device context will be destroyed or it may perform a full cleanup when exiting, in which case all objects will be destroyed and device mappings will be unmapped.

Typical implementation of VERBS or UIO uses a file object interface. When a device context is opened, a file object is created by a kernel device driver. The interfaces for opening, closing and memory mapping of the file object are provided by the device driver. The separation of device contexts is achieved by using different file objects for different device objects. When application call device driver, they provide the file object (file descriptor) for the device context. Calls to the driver are implemented as read, write or IO controls on the file object.

The file objects are tracked by the device driver and are reference counted. Typically, device drivers do no track process-to-file object relationship, since file object gives direct reference to the device context. When a context is opened or mapped, the reference count increases. When context is closed or unmapped, the reference count decreases. When reference count reaches zero, the device context (and all objects that belong to it) are destroyed. This allows automatic cleanup (without explicit call to each object destroy) upon process exit—since all files are closed and all mappings are unmapped by the operating system, the process device context will be destroyed.

Each application may open multiple device context. High speed PCI devices may have multiple hardware queues and interrupts, and multiple application threads and multiple device context may be required to get to maximum performance. Typical applications may open 100 threads, each having a separate device context, while each thread is tied to a given CPU and may use a hardware queue and interrupt line that is tied to the same CPU for maximum performance.

When multiple device contexts, multiple applications, and multiple computer nodes are used to implement a product, a solution may be required to implement detaching of a failed application from a PCI mapped device. Since applications are able to perform DMA from user-space and thus modify data on local or remote nodes, a failed application cannot be considered as fenced, before its detach from PCI device is not complete and appropriate error recovery cannot proceed and complete. Killing the application is not always acceptable choice for three reasons:
- the exit times of a large application can be significant, even before detaching from PCI device is considered. For example, freeing hundreds of gigabytes of virtual memory can take multiple seconds.
- There is no good interface to know when a process completes exit. Typically, the process is listed as "exited" at the start of the process exit, before all cleanups complete.
- Since file descriptors are closed one by one, and memory mappings are unmapped one by one, device contexts will be destroyed one by one and not in parallel. Thus, the command parallelism of modern PC adapters and multiple processors cannot be utilized in this case. Since a process may have 100 mappings or more, and each mapping may have many objects to destroy, the total shutdown time may reach tens of seconds.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising at least one processor and at least one memory, the at least one memory comprising instructions that are executed by the at least one processor and configure the at least one processor to implement a device context device driver for forced detaching of an application from mapped devices. The method comprises receiving, by the device context device driver, a command to detach an application, wherein the command specifies a process descriptor associated with the application. The method further comprises identifying, by the device context device driver, a plurality of matching device context entries in a list of open device contexts maintained by the device context device driver that match the process descriptor. The method further comprises marking, by the device context device driver, the plurality of matching device context entries as detached. The method further comprises invalidating, by the device context device driver, mapped memory areas associated with the plurality of matching device context entries. The method further comprises shutting down, by the device context device driver, all device contexts associated with the plurality of matching device context entries.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide mechanisms for forced detaching of applications from a DMA-capable PCI mapped device. The illustrative embodiments provide a device driver that implements memory mapping. The device driver tracks all device contexts opened by applications. Each device context also tracks the list of memory mapped areas and ties them to process context (or memory protection context). Additionally, the driver provides an application programming interface (API) to detach a process from the device maps.

Detach works by iterating over the list of opened device contexts. Each open device is marked as detached. Further commands, including mapping commands, will fail. The device driver then invalidates device mappings for the detached process, preventing application access by the process. After the mappings are invalidated, the device driver destroys user contexts using the same API that would be called if the process exited. Device command parallelism can be utilized to destroy multiple device contexts at once or multiple objects within the same device context at once.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
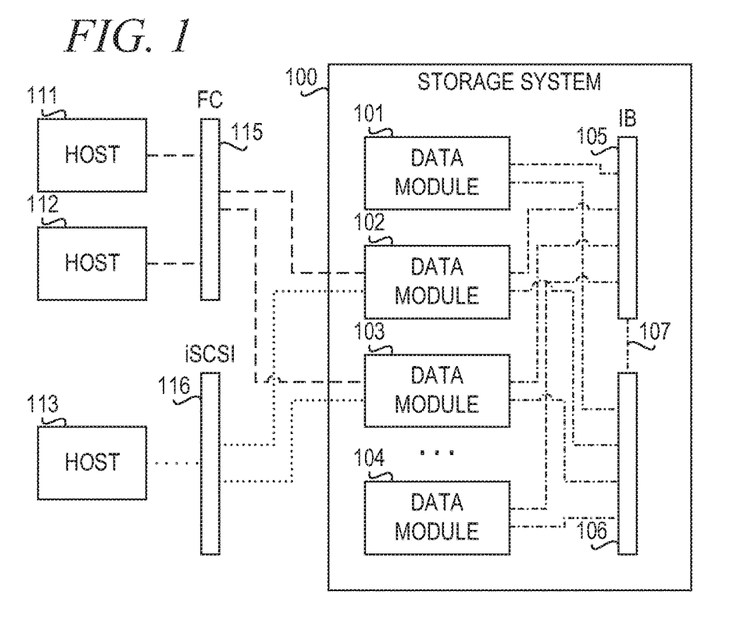
FIG. 1 depicts a pictorial representation of an example storage system in which aspects of the illustrative embodiments may be implemented.
Figure 2:
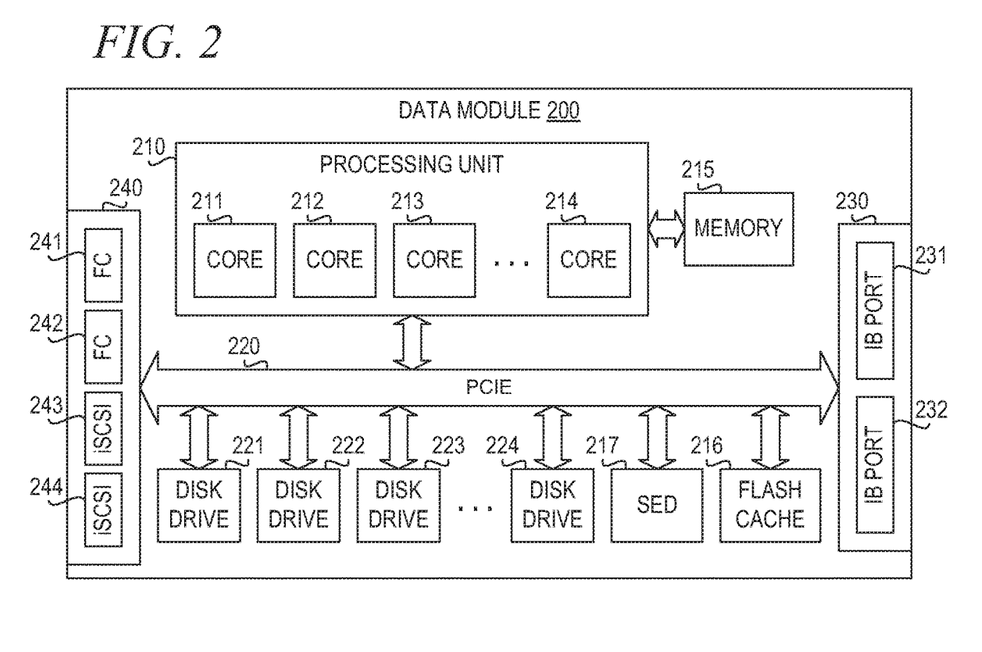
FIG. 2 is a block diagram of an example data module in which aspects of the illustrative embodiments may be implemented.
Figure 3:
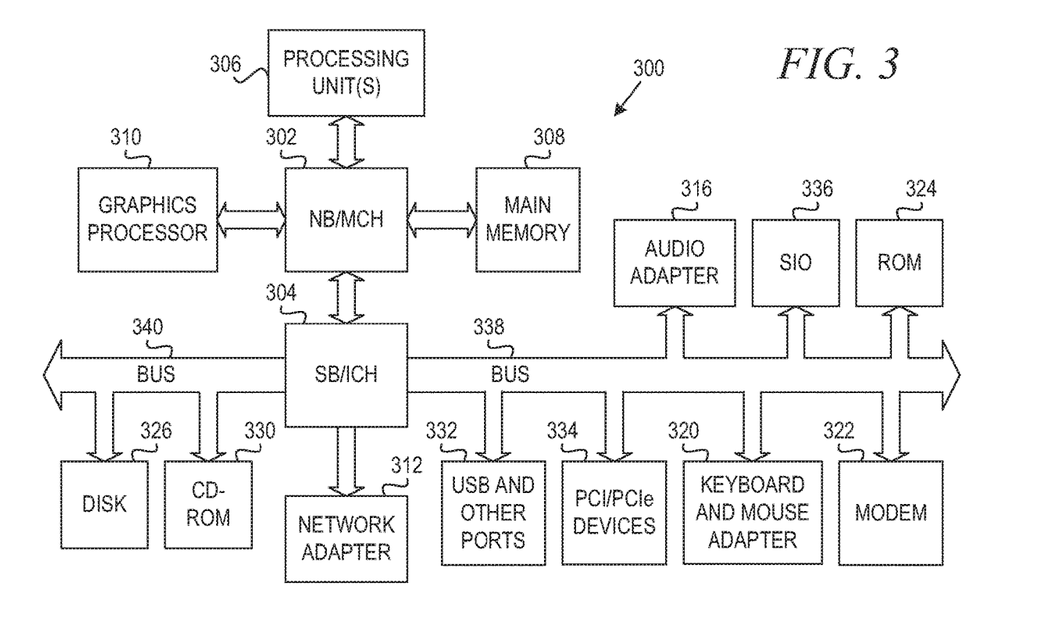
FIG. 3 is a block diagram of just one example data processing system in which aspects of the illustrative embodiments may be implemented.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example storage system in which aspects of the illustrative embodiments may be implemented. In the depicted example, hosts 111, 112 connect to storage system 100 via Fibre Channel (FC) switch 115, and host 113 connects to storage system 100 via Internet small computer systems interface (iSCSI) switch 116. Storage system 100 is a scalable enterprise storage system that is based on a grid array of hardware components. Storage system 100 can attach to both Fibre Channel Protocol (FCP) and Internet Protocol (IP) network iSCSI capable hosts 111-113. Storage system 100 supports a wide range of enterprise features, including hardware redundancy, synchronous and asynchronous mirroring, thin provisioning, data migration, quality of service controls, support for virtualization platforms, differential snapshots, compression, encryption, etc.

Storage system 100 has a variable number of data modules 101-104 (e.g., 6, 9, 12, or 15 modules). Data modules 101-104 communicate with each other via an InfiniBand (IB) network, facilitated by two IB switches 105, 106 connected via inter-module connectivity 107. Each data module 101-104 can serve as a cache driving backend IO and cache coherency. A limited number of data modules—in the depicted example, data modules 102, 103—can serve as interfaces, providing FCP or iSCSI connectivity to hosts 111-113.

Storage system 100 may distribute data across all backend storage equally, so that each created volume is striped across all backend disks. In one example embodiment, two copies of each volume slice may be used, stored on different modules. Each volume slice has a designated primary and secondary cache. For reads, the data is fetched by an interface data module (e.g., data module 102) from the relevant primary cache module (e.g., data module 104). Reading a volume slice will cache it. For writes, an interface data module (e.g., data module 103) sends data to primary cache and the primary cache replicates data to the secondary cache (e.g., data module 101). The completion of the write is returned when two copies of data are stored in memory of two different modules (e.g., data modules 101, 103). Actual writing of data to backend storage or eviction to solid state drive (SSD) caches is done in the background according to cache management algorithms.

In an alternative embodiment, each volume uses three copies: one primary copy and two secondary copies. Read IOs fetch relevant data from the primary cache node and from the backend if not found in cache. The write IOs send data to primary cache, and the primary cache replicates the data to the secondary caches. The writes are completed after three copies of data are stored in memory of three different caches. This allows simultaneous loss of two data modules without data loss. At the same time, rebuilds are significantly faster and require only synchronizing caches or cache destages.

As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the data modules 101-104 and/or hosts 111-113 may be specifically configured to implement a mechanism for detaching from a PCI memory mapped device. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as data module 101 or host 111, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates path resolution.

FIG. 2 is a block diagram of an example data module in which aspects of the illustrative embodiments may be implemented. Data module 200 comprises processing unit 210, which has a plurality of processing cores 201-204, and memory 211. Processing unit 210 connects to peripheral component interconnect express (PCIe) bus 220, through which processing unit 210 communicates with flash cache 212, self-encrypting drive 213, disk drives 221-223, Infini-Band (IB) adapter 230, and IO adapter 240. In the depicted example, IB adapter 230 has two IB ports 231, 232, and IO adapter 240 has two Fibre Channel (FC) ports 241, 242 and two Internet small computer systems internet (iSCSI) ports 243, 244.

Instructions for the operating system, the object-oriented programming system, and applications or programs are located on storage devices, such as disk drive 221, and may be loaded into memory 215 for execution by processing unit 210. The processes for illustrative embodiments of the present invention may be performed by processing unit 210 using computer usable program code, which may be located in a memory such as, for example, memory 215. As such, the data module shown in FIG. 2 becomes specifically configured to implement the mechanisms of the illustrative embodiments and specifically configured to perform the operations and generate the outputs described hereafter with regard to path resolution.

FIG. 3 is a block diagram of just one example data processing system in which aspects of the illustrative embodiments may be implemented. Data processing system 300 is an example of a computer, such as host 111 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 300 employs a hub architecture including north bridge and memory controller hub (NB/MCH) 302 and south bridge and input/output (I/O) controller hub (SB/ICH) 304. Processing unit 306, main memory 308, and graphics processor 310 are connected to NB/MCH 302. Graphics processor 310 may be connected to NB/MCH 302 through an accelerated graphics port (AGP).

In the depicted example, local area network (LAN) adapter 312 connects to SB/ICH 304. Audio adapter 316, keyboard and mouse adapter 320, modem 322, read only memory (ROM) 324, hard disk drive (HDD) 326, CD-ROM drive 330, universal serial bus (USB) ports and other communication ports 332, and PCI/PCIe devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash basic input/output system (BIOS).

HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface. Super I/O (SIO) device 336 may be connected to SB/ICH 304.

An operating system runs on processing unit 306. The operating system coordinates and provides control of various components within the data processing system 300 in FIG. 3. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 300.

As a server, data processing system 300 may be, for example, an IBM eServer™ System P® computer system, Power™ processor based computer system, or the like, running the Advanced Interactive Executive (AIX®) operating system or the LINUX® operating system. Data processing system 300 may be a symmetric multiprocessor system including a plurality of processors in processing unit 306. Alternatively, a single processor system may be employed.

Instructions for the operating system, the object-oriented programming system, and applications or programs are located on storage devices, such as HDD 326, and may be loaded into main memory 308 for execution by processing unit 306. The processes for illustrative embodiments of the present invention may be performed by processing unit 306 using computer usable program code, which may be located in a memory such as, for example, main memory 308, ROM 324, or in one or more peripheral devices 326 and 330, for example.

A bus system, such as bus 338 or bus 340 as shown in FIG. 3, may be comprised of one or more buses. Of course, the bus system may be implemented using any type of communication fabric or architecture that provides for a transfer of data between different components or devices attached to the fabric or architecture. A communication unit, such as modem 322 or network adapter 312 of FIG. 3, may include one or more devices used to transmit and receive data. A memory may be, for example, main memory 308, ROM 324, or a cache such as found in NB/MCH 302 in FIG. 3.

As mentioned above, in some illustrative embodiments the mechanisms of the illustrative embodiments may be implemented as application specific hardware, firmware, or the like, application software stored in a storage device, such as HDD 326 and loaded into memory, such as main memory 308, for executed by one or more hardware processors, such as processing unit 306, or the like. As such, the computing device shown in FIG. 3 becomes specifically configured to implement the mechanisms of the illustrative embodiments and specifically configured to perform the operations and generate the outputs described hereafter with regard to path resolution.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the illustrative embodiments may be applied to a multiprocessor data processing system, other than the symmetric multiprocessor system mentioned previously, without departing from the spirit and scope of the present invention.

Figure 4:
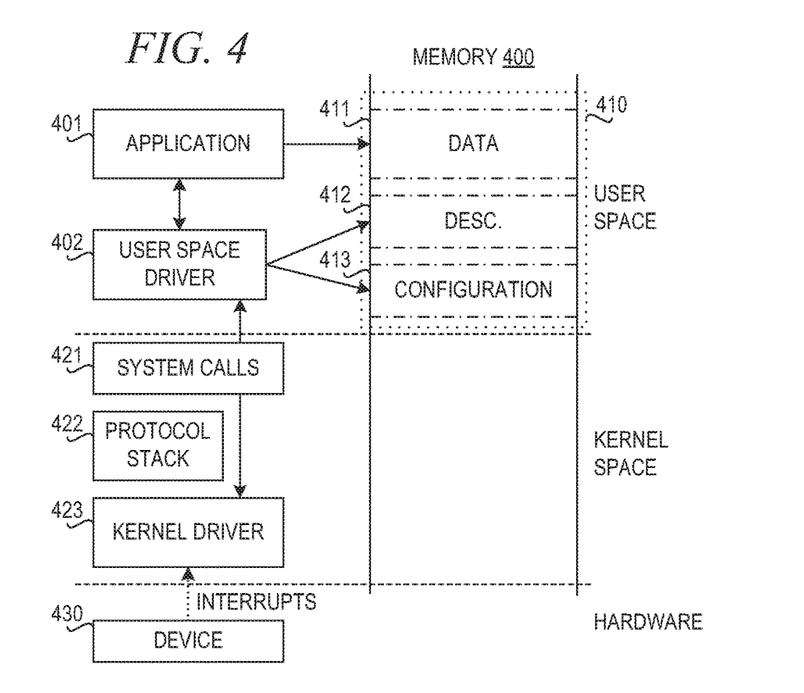
FIG. 4 illustrates a user space device driver in which aspects of the illustrative embodiments may be implemented.

FIG. 4 illustrates a user space device driver in which aspects of the illustrative embodiments may be implemented. In the realm of high-speed interconnect or other data processing devices that use DMA or RDMA capabilities, user-space PCI direct hardware access is commonplace. Examples of such devices and solutions include InfiniBand, 10 Gigabit Ethernet, Fibre Channel interconnect adapters, NVM Express® storage adapters, and compression or encryption cards. Existing software solutions allow multiple applications, such as application 401, to share a device, such as device 430, where application 401 opens a private device context 410 in memory 400. Application 401 effectively runs a user space driver 402 in user space. The hardware access is done via memory mapped registers and data using user space driver 402, system calls 421, protocol stack 422, and kernel driver 423.

The device context 410 includes configuration space 413, IO descriptor space 412, and IO data space 411. Configuration space 413 includes the common configuration registers of the device 430. IO descriptor space 412 includes the descriptors used by the device to access data from the device. IO data space 411 includes the actual 10 data accessed from the device. IO data space 411, descriptor space 412, and configuration space 413 make up the memory mapped region of device context 410 for application 401.

Other applications, in addition to application 401, may share device 430. Each application opens a respective device context 410 in memory 400 and runs a user space driver 402. In addition, each application 401 may access other devices in addition to device 430. Thus, there may be many device contexts open for many applications and many devices. If an application fails, it is desirable to flush its connection and DMA/RDMA transfers to know that application will not make any changes in local or remote memory. This may become a problem if wait times are in the range of tens of seconds. Therefore, killing the application is not always acceptable. Additionally, killing the application cancels the ability to view and diagnose its step in a debugger. Sending events to the application and expecting it to detach from the resource also has the same limitations as its kill, because the application is limited to serialize detach and slow destroy. In general, it is not safe to expect the application to detach if the application has failed and its state or memory resources are corrupt.

Figure 5A:
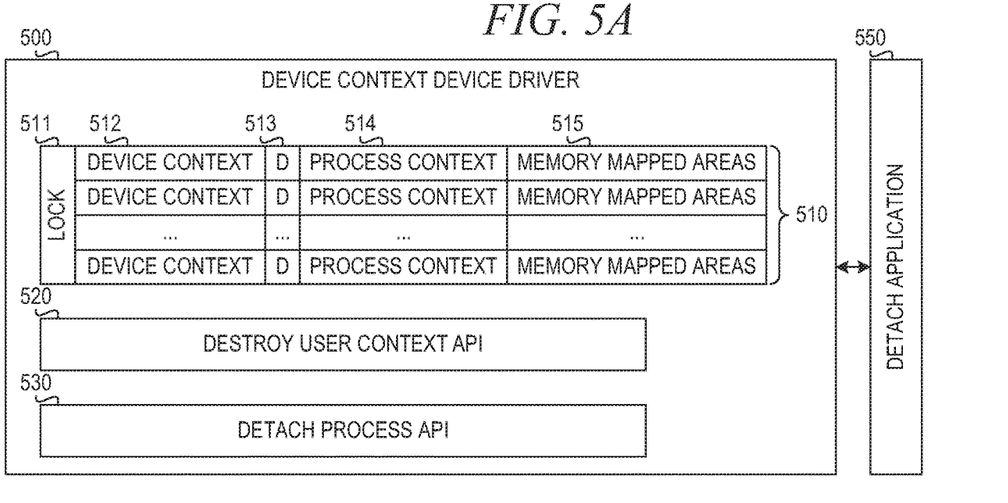
FIGS. 5A and 5B are block diagrams of a device context device driver for forced detaching of applications from DMA-capable PCI mapped devices in accordance with an illustrative embodiment.
Figure 5B:
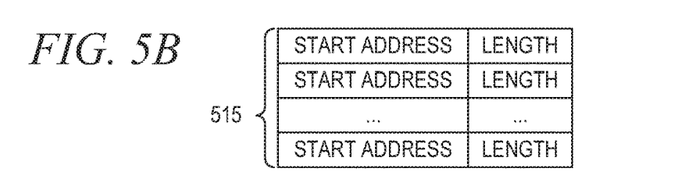

FIGS. 5A and 5B are block diagrams of a device context device driver for forced detaching of applications from DMA-capable PCI mapped devices in accordance with an illustrative embodiment. Referring to FIG. 5A, device context device driver 500 is a PCI device driver that implements memory mapping requests and tracks all device contexts opened by applications. Device context device driver 500 maintains a list 510 of all opened device contexts. The list is protected by lock 511. An open function adds to the list 510, a destroy function removes a device context from the list 510. Field 512 identifies the device context. Each device context instance has a field 513 describing a detaching state (whether the application is detached or not detached from the device).

All commands that fault into the into the device driver 500, including mapping commands, take the lock 511 and check the detaching state 513. If the state 513 is detached, then the command returns an error. Each device context instance in the list has a process context field 514 that has mapped the device (if mappings are present). Only a single process context is allowed to map and access each device context.

Each device context instance in device context list 510 also has a list of memory mapped areas 515. FIG. 5B depicts a list of memory mapped areas in accordance with the illustrative embodiment. Each entry of list 514 includes a start address, a length. New maps are added to the list 514 when created and removed from the list when unmapped.

Detach works from a separate detach application 550 and does not require any action on the part of the application being detached. Device context device driver 500 provides detach process application programming interface (API) 530, which includes an IO control command that can be called by application 550 to detach a process from the device maps. Detach works by iterating over the list of opened device contexts 510. Each device context opened by the application (process) being detached is marked as detached, and further commands, including mapping commands, will fail. The mappings in the list of memory mapped areas 514 are invalidated, thus preventing access by the application being detached.

Device context device driver 500 also includes a private destroy user context API 520. After mappings are invalidated in list 514, the device driver (in the context of detach application 550) calls destroy user context API 520 to destroy the user contexts. In one embodiment, destroy user context API 520 is the same API that would be called if the process exited. In another embodiment, and optimized version that uses device command parallelism is implemented to destroy multiple device contexts and multiple objects within the same context simultaneously.

Figure 6:
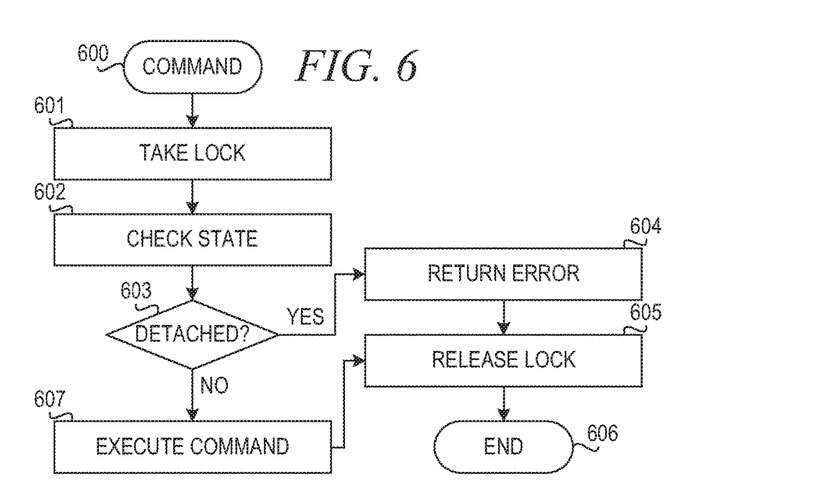
FIG. 6 is a flowchart illustrating operation of a mechanism for handling commands faulting to a device context device driver in accordance with an illustrative embodiment.

FIG. 6 is a flowchart illustrating operation of a mechanism for handling commands faulting to a device context device driver in accordance with an illustrative embodiment. Operation begins when a command faults to the device context device driver (block 600). The command may be a command to add a new map to the list of memory mapped areas or to remove a map from the list when a memory mapped area is unmapped.

The mechanism takes the lock for the device context list (block 601) and checks the state of a device context associated with the command (block 602). The device determines whether the state of the device context is detached (block 603). If the state of the device context in the device context list is detached, then the mechanism returns an error (block 604), releases the lock (block 605), and operation ends (block 606). If the state of the device context is not detached in block 603, then the mechanism executes the command (block 607). Thereafter the mechanism releases the lock (block 605) and operation ends (block 606).

Figure 7:
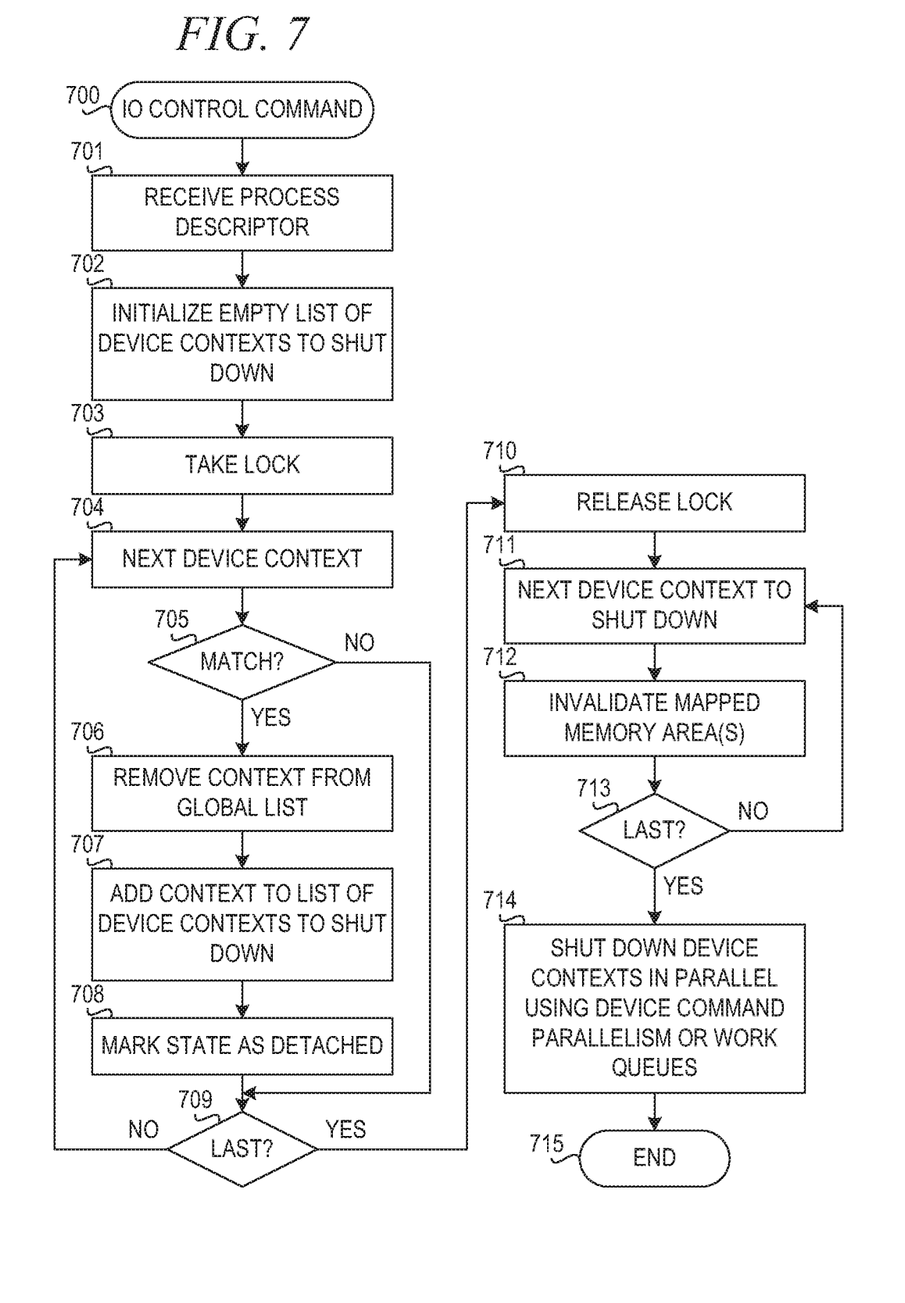
FIG. 7 is a flowchart illustrating operation of a mechanism for forcing detaching of an application from mapped devices in accordance with an illustrative embodiment.

FIG. 7 is a flowchart illustrating operation of a mechanism for forcing detaching of an application from mapped devices in accordance with an illustrative embodiment. Operation begins when an IO control command is received specifying a process descriptor of an application to be detached (block 700). The mechanism receives the process descriptor (block 701) and initializes an empty list of device contexts to shut down (block 702). The mechanism then takes the lock for the device context list of all open device contexts (block 703). The mechanism considers the next (first) device context in the list of open device contexts (block 704) and determines whether the device context matches the process descriptor (block 705).

If the device context matches the process descriptor, then the mechanism removes the device context from the global list of open device contexts (block 706), adds the device context to the list of device contexts to be shut down (block 707), and marks its state as detached (block 708). Thereafter, or if the device context does not match the process descriptor in block 705, the mechanism determines whether the device context is the last device context in the global list of open device contexts (block 709). If the device context is not the last in the global list, then operation returns to block 704 to consider the next device context in the global list of open device contexts.

If the device context is the last in the global list in block 709, then the mechanism releases the lock (block 710). Then, the mechanism considers the next (first) device context to shut down from the list (block 711) and invalidates the mapped memory areas by modifying page table entries of the process (block 712). The mechanism determines whether the device context is the last to be shut down in the list (block 713). If the device context is not the last in the list of device contexts to be shut down, then operation returns to block 711 to consider the next device context to be shut down.

If the device context is the last in the list of device contexts to be shut down in block 713, then the mechanism shuts down the device contexts in the list of device contexts to be shut down in parallel using command parallelism or work queues (block 714). Thereafter, operation ends (block 715).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions that are executed by the at least one processor and configure the at least one processor to implement a device context device driver for forced detaching of a failed application from mapped devices, the method comprising:

receiving, by the device context device driver, a command from a detach application to detach a failed application, wherein the command specifies a process descriptor associated with the failed application, wherein the device context device driver implements memory mapping requests and maintains a list of all opened device contexts;

identifying, by the device context device driver, a plurality of matching device context entries in a list of open device contexts maintained by the device context device driver that match the process descriptor;

marking, by the device context device driver, the plurality of matching device context entries as detached;
invalidating, by the device context device driver, mapped memory areas associated with the plurality of matching device context entries; and
shutting down, by the device context device driver, all device contexts associated with the plurality of matching device context entries.

2. The method of claim 1, wherein marking the plurality of matching device context entries as detached comprises for each given entry in the plurality of matching device context entries:
removing the given entry from the list of open device contexts;
adding the given entry to a list of device contexts to shut down; and
updating a detached state field of the given entry in the list of device contexts to shut down.

3. The method of claim 2, wherein marking the plurality of matching device context entries as detached comprises:
taking a lock on the list of open device contexts; and
responsive to removing the plurality of matching device context entries from the list of open device contexts, releasing the lock.

4. The method of claim 2, wherein invalidating mapped memory areas associated with the plurality of matching device context entries comprises for each given entry in the list of device contexts to shut down, invalidating mapped memory areas associated with the given entry.

5. The method of claim 2, wherein shutting down all device contexts associated with the plurality of matching device context entries comprises shutting down all device contexts in the list of device contexts to shut down.

6. The method of claim 1, wherein each entry of the list of open device contexts comprises an identifier of the device context, a detached state field, a process context descriptor, and a list of memory mapped areas.

7. The method of claim 6, wherein each entry of the list of memory mapped areas comprises a start address and a length.

8. The method of claim 1, wherein shutting down all device contexts associated with the plurality of matching device context entries comprises shutting down all device contexts associated with the plurality of matching device context entries in parallel using device command parallelism or work queues.

9. The method of claim 1, wherein the command is provided by a detach process application programming interface in the device context device driver.

10. The method of claim 1, further comprising:
responsive to receiving a subsequent command to add or remove a memory mapped area to a given device context, checking, by the device context device driver, a detach state of the given device context; and
responsive to detach state of the given device context being detached, returning an error.

11. A computer program product comprising a computer readable storage medium having a computer readable program stored therein, wherein the computer readable program, when executed on a computing device, causes the computing device to implement a device context device driver for forced detaching of a failed application from mapped devices, wherein the computer readable program causes the computing device to:
receive, by the device context device driver, a command from a detach application to detach a failed application, wherein the command specifies a process descriptor associated with the failed application, wherein the device context device driver implements memory mapping requests and maintains a list of all opened device contexts;
identify, by the device context device driver, a plurality of matching device context entries in a list of open device contexts maintained by the device context device driver that match the process descriptor;
mark, by the device context device driver, the plurality of matching device context entries as detached;
invalidate, by the device context device driver, mapped memory areas associated with the plurality of matching device context entries; and
shut down, by the device context device driver, all device contexts associated with the plurality of matching device context entries.

12. The computer program product of claim 11, wherein marking the plurality of matching device context entries as detached comprises for each given entry in the plurality of matching device context entries:
removing the given entry from the list of open device contexts;
adding the given entry to a list of device contexts to shut down; and
updating a detached state field of the given entry in the list of device contexts to shut down.

13. The computer program product of claim 12, wherein marking the plurality of matching device context entries as detached comprises:
taking a lock on the list of open device contexts; and
responsive to removing the plurality of matching device context entries from the list of open device contexts, releasing the lock.

14. The computer program product of claim 12, wherein invalidating mapped memory areas associated with the plurality of matching device context entries comprises for each given entry in the list of device contexts to shut down, invalidating mapped memory areas associated with the given entry.

15. The computer program product of claim 12, wherein shutting down all device contexts associated with the plurality of matching device context entries comprises shutting down all device contexts in the list of device contexts to shut down.

16. The computer program product of claim 11, wherein each entry of the list of open device contexts comprises an identifier of the device context, a detached state field, a process context descriptor, and a list of memory mapped areas.

17. The computer program product of claim 16, wherein each entry of the list of memory mapped areas comprises a start address and a length.

18. The computer program product of claim 11, wherein shutting down all device contexts associated with the plurality of matching device context entries comprises shutting down all device contexts associated with the plurality of matching device context entries in parallel using device command parallelism or work queues.

19. The computer program product of claim 11, wherein the command is provided by a detach process application programming interface in the device context device driver.

20. An apparatus comprising:
at least one processor; and
a memory coupled to the at least one processor, wherein the memory comprises instructions which, when executed by the at least one processor, cause the at least one processor to implement a device context device driver for forced detaching of a failed application from mapped devices, wherein the instructions cause the at least one processor to:

receive, by the device context device driver, a command from a detach application to detach a failed application, wherein the command specifics a process descriptor associated with the failed application, wherein the device context device driver implements memory mapping requests and maintains a list of all opened device contexts;

identify, by the device context device driver, a plurality of matching device context entries in a list of open device contexts maintained by the device context device driver that match the process descriptor;

mark, by the device context device driver, the plurality of matching device context entries as detached;

invalidate, by the device context device driver, mapped memory areas associated with the plurality of matching device context entries; and shut down, by the device context device driver, all device contexts associated with the plurality of matching device context entries.

\* \* \* \* \*